United States Patent [19]

Joffee et al.

[11] Patent Number: 4,855,163

[45] Date of Patent: Aug. 8, 1989

[54] METHOD OF MAKING POLYVINYLIDENE DIFLUORIDE STRUCTURE

[75] Inventors: Irving B. Joffee; Peter J. Degen, both of Huntington; Frederick A. Baltusis, Freeport, all of N.Y.

[73] Assignee: Pall Corporation, Glen Cove, N.Y.

[21] Appl. No.: 197,844

[22] Filed: May 24, 1988

Related U.S. Application Data

[62] Division of Ser. No. 857,945, May 1, 1986, Pat. No. 4,774,132.

[51] Int. Cl.$^4$ .................... B05D 3/10; B05D 5/00
[52] U.S. Cl. .................... 427/244; 427/302; 427/322; 427/393.5
[58] Field of Search .......... 427/244-246, 427/302, 322, 393.5; 521/27, 54; 428/29, 304.4

[56] References Cited

U.S. PATENT DOCUMENTS

| | | | |
|---|---|---|---|
| 2,606,177 | 8/1952 | Downing | 260/92.8 |
| 2,788,306 | 4/1957 | Cox et al. | 154/139 |
| 2,972,586 | 2/1961 | van der Neut et al. | 260/2.1 |
| 3,041,316 | 6/1962 | Griffin | 260/79 |
| 3,133,854 | 5/1964 | Simms | 161/189 |
| 3,247,133 | 4/1966 | Chen | 260/2.1 |
| 3,253,057 | 5/1966 | Landler et al. | 260/877 |
| 3,257,334 | 6/1966 | Chen et al. | 260/2.1 |
| 3,551,246 | 12/1970 | Bassemir et al. | 156/272 |
| 3,621,085 | 11/1971 | Ichikawa | 264/3 |
| 3,632,387 | 1/1972 | Sotherland | 117/47 |
| 3,676,192 | 7/1972 | Hahn | 117/93.31 |
| 3,684,747 | 8/1972 | Coalson et al. | 260/2.5 |
| 3,723,306 | 3/1973 | Bridgeford | 210/22 |
| 3,750,735 | 8/1973 | Chiang et al. | 159/49 |
| 3,759,807 | 9/1973 | Osborn et al. | 204/159.23 |
| 3,790,645 | 8/1971 | Murayama et al. | 260/884 |
| 3,839,172 | 10/1974 | Chapiro et al. | 204/159.17 |
| 4,137,137 | 1/1979 | Machi et al. | 204/159.16 |
| 4,143,218 | 3/1979 | Adamo et al. | 429/254 |
| 4,151,225 | 4/1979 | Büning | 260/878 |
| 4,164,463 | 8/1979 | Fang | 204/296 |
| 4,178,221 | 12/1979 | Boutui et al. | 204/159.23 |
| 4,189,369 | 2/1980 | Fang | 204/296 |
| 4,200,538 | 4/1980 | Seita et al. | 210/500 M |
| 4,262,041 | 4/1981 | Eguchi et al. | 427/245 |
| 4,278,777 | 7/1981 | Jakabhazy et al. | 525/276 |
| 4,288,467 | 9/1981 | Machi et al. | 427/44 |
| 4,311,573 | 1/1982 | Mayhau et al. | 204/159.15 |
| 4,316,772 | 2/1982 | Cheng et al. | 202/163 |
| 4,340,482 | 7/1982 | Sternberg | 210/500.2 |
| 4,377,481 | 3/1983 | Jakabhazy | 210/500.2 |
| 4,396,727 | 8/1983 | Ishigaki et al. | 521/27 |
| 4,407,846 | 10/1983 | Machi et al. | 427/35 |
| 4,412,922 | 11/1983 | Mir | 210/638 |
| 4,414,280 | 11/1983 | Silva et al. | 428/422 |
| 4,419,242 | 12/1983 | Cheng et al. | 210/500.2 |
| 4,423,193 | 12/1983 | Melby et al. | 525/296 |
| 4,468,441 | 8/1984 | D'Agostino et al. | 429/105 |
| 4,470,859 | 9/1984 | Benezra et al. | 156/155 |
| 4,499,211 | 2/1985 | Walch et al. | 521/145 |
| 4,501,785 | 2/1985 | Nakanishi | 428/195 |
| 4,506,035 | 3/1985 | Barnett et al. | 521/53 |
| 4,618,533 | 10/1986 | Steuck | 428/315.7 |

FOREIGN PATENT DOCUMENTS 0186758 7/1986 European Pat. Off. .
WO85/01222 3/1985 PCT Int'l Appl. .

Primary Examiner—Evan K. Lawerence
Attorney, Agent, or Firm—Leydig, Voit & Mayer

[57] ABSTRACT

A polyvinylidene difluoride structure with a critical surface energy of at least about 80 dynes/cm and a method of making such a structure comprising the steps of contacting a polyvinylidene difluoride structure with an alkalized solution, such as potassium hydroxide, to form activated sites on the surface of the structure; rinsing the activated structure to remove residual alkali; contacting the rinsed, activated structure with a solution of a polymerization initiator, such as potassium peroxydisulfate, and a polymerizable vinylic monomer, such as acrylic acid; and polymerizing and grafting the monomer to the activated structure to form a polyvinylidene difluoride structure with a critical surface energy of at least about 80 dynes/cm.

13 Claims, No Drawings

METHOD OF MAKING POLYVINYLIDENE DIFLUORIDE STRUCTURE

This application is a division of application Ser. No. 857,945 filed May 1, 1986, now U.S. Pat. No. 4,774,132.

TECHNICAL FIELD

The present invention relates to polyvinylidene difluoride structures, such as microporous membranes used as filtration media. More particularly, the present invention relates to polyvinylidene difluoride structures wettable with fluids having high surface tensions and to a method for preparing such structures.

BACKGROUND ART

Many industrial operations require the use of high purity, particle-free fluids. In particular, the manufacture of semiconductor-based integrated circuits requires the regular use of very aggressive fluids such as strong mineral acids, corrosive materials such as HF, concentrated salt solutions or combinations of such materials.

Many of these fluids, such as HF/NH$_4$F buffers which are used to etch patterns in silicon oxide layers deposited on high purity silicon wafers, have high surface tensions on the order of 85 dynes/cm or even higher, i.e, substantially higher than that of water which has a surface tension of 72 dynes/cm. In order to produce a particle-free fluid, these materials must be filtered. To be useful for filtering these aggressive fluids, the filter medium should be inert to the fluids, offer little resistance to flow of the fluids through the filter, and be fully wettable by the fluids.

A material commonly used in equipment which handles HF/NH$_4$F mixtures is polyvinylidene difluoride ("PVDF"). PVDF is inert to such mixtures, being neither weakened by them nor introducing any contaminants into them. PVDF filter media, particularly microporous membranes, can be prepared to exhibit high efficiency for particle removal. However, PVDF has a low critical surface energy and conventional, hydrophobic, microporous PVDF membranes will not wet with fluids having surface tensions higher than about 32 dynes/cm. To spontaneously wet a PVDF structure, the surface tension of the liquid must be no greater than the critical surface energy of the structure.

A commercially available, microporous PVDF membrane sold under the Durapore trademark (Millipore, Inc.) is available in a hydrophilic version which wets spontaneously with water, i.e., it has a critical surface energy of at least 72 dynes/cm, the surface tension of water. However, this membrane will not spontaneously wet with typical HF/NH$_4$F mixtures having surface tensions of about 85 dynes/cm. Indeed, this commercial filter membrane will not spontaneously wet with fluids having surface tensions greater than about 75 dynes/cm indicating a critical surface energy no higher than about 75 dynes/cm. Other commercial filter materials which are inert to HF/NH$_4$F mixtures, such as polypropylene webs and microporous polysulfone and polycarbonate membranes, are also incapable of being spontaneously wetted with commonly used fluids having high surface tensions.

Lack of spontaneous wetting of the filter membrane by the fluid to be filtered requires that the membrane be prewetted with a low surface tension fluid. This prewetting fluid must then be replaced with the fluid to be filtered before the filter can be placed into service. Typical prewetting procedures comprise (1) prewetting the filter with a low surface tension alcohol, (2) flushing the alcohol out with high purity water, and (3) flushing the water out with the fluid to be filtered. This procedure is time-consuming and each operation provides an opportunity for accidental contamination of the filter or fluid to be filtered. Spontaneous wetting with the high-surface tension fluid to be filtered is, therefore, a very desirable characteristic of a filter medium used in a filter for applications such as that described above.

DISCLOSURE OF INVENTION

In accordance with the present invention, a method is provided of making a polyvinylidene difluoride structure with a high critical surface energy while maintaining the integrity and desired physical properties of the PVDF structure. As employed herein, the term "surface" refers not only to the gross surface(s) of the structure but also, in those cases where a microporous structure such as a membrane is employed, to the surfaces of the micropores, i.e., the interior surfaces of the structure which are contacted by fluid during use.

The method in accordance with the present invention comprises the steps of:

(a) contacting a polyvinylidene difluoride structure with an alkali solution to form activated sites on the surface of the structure;

(b) rinsing the activated structure to remove residual alkali;

(c) contacting the rinsed, activated structure with a solution of at least one polymerizable vinylic monomer, as described in more detail below, and a polymerization initiator; and (d) polymerizing and grafting the at least one polymerizable vinylic monomer to the activated structure to form a surface-modified polyvinylidene difluoride structure having a critical surface energy of at least about 80 dynes/cm. For many applications, the surface-modified structure is thereafter rinsed with pure water.

Further, in accordance with the present invention, a surface-modified, high critical surface energy PVDF structure, such as a microporous membrane or fibrous web, is contemplated which comprises a PVDF substrate having grafted thereto a polymer derived at least in part from a polymerizable vinylic monomer as described in more detail below, the polymer including functional groups sufficiently polar or ionic that the structure has a critical surface energy of at least about 80 dynes/cm. This surface-modified, high critical surface energy PVDF structure is formed by the method outlined above. It generally has the desirable mechanical properties and inertness of the polyvinylidene difluoride substrate from which it is formed but additionally has a modified surface with a high critical surface energy, i.e., it wets spontaneously with fluids having surface tensions of 80 dynes/cm or even 85 dynes/cm or higher. Porous structures formed in accordance with this invention are suitable for use as filter media as well as in other applications in a higher surface tension fluid environment.

BEST MODE FOR CARRYING OUT THE INVENTION

The present invention includes a step-wise process in which a polyvinylidene difluoride structure or substrate is treated with an aqueous solution of strong alkali to form activated sites on the surface of the structure, that is, an activated structure or substrate. Thereafter, the activated structure is thoroughly rinsed to remove alkali and any other contaminants which may be present. The rinsed, activated structure is then contacted with a solution containing a polymerization initiator and at least one appropriate polymerizable vinylic monomer as described below. The monomer is then polymerized and grafted to the PVDF structure or substrate to form a modified structure with the polymer grafted onto or bonded to the polyvinylidene difluoride structure. The conditions and reagents required in each of the steps are described in greater detail below.

FORMATION OF A POLYVINYLIDENE DIFLUORIDE STRUCTURE OR SUBSTRATE HAVING ACTIVE SITES

A variety of polyvinylidene difluoride structures may be employed in the present invention. These include microporous membranes such as a hydrophobic PVDF membrane available from Pall Corporation, PVDF membranes available from Millipore, Inc. under the Durapore brand, PVDF membranes such as those described in U.S. Pat. No. 4,203,848, PVDF fibrous webs, PVDF fibers, and the like. When the PVDF structure is to be employed in an aqueous medium, and particularly as a filtration medium, a porous material is preferred and, for some applications, the material preferably is microporous, that is, has pore ratings in the range of from about 0.01 to about 2.0 micrometers, preferably from about 0.04 to about 1.5 micrometers, and most preferably from about 0.04 to about 0.2 micrometer as measured using the technique described below.

Pore ratings of the filter membranes were determined by measuring the $K_L$ of the membrane. The $K_L$ is essentially equivalent to bubble point, foam-all-over point and other similar techniques familiar to those skilled in the art.

Pore rating is related to $K_L$ by the formula $$D = \frac{C}{K_L}$$

where D is the pore rating in micrometers, $K_L$ is the measured $K_L$ in psi and C is a constant, which has a value of about 3.5 when using isopropyl alcohol as a wetting fluid for $K_L$ measurement. This relation is described in Publication NM 900a, dated September 1980 and available from Pall Corporation and incorporated herein by reference. For applications in the electronics industry, microporous membranes with pore ratings in the range from about 0.04 to about 0.2 micrometers are typically used.

The invention will be described below with regard to the preferred structure, a microporous membrane.

To form active sites on the PVDF structure or substrate, the surface of the structure must be wetted with the alkali solution as described below. Accordingly, when a dry membrane is selected, it must be pre-wetted with a low surface tension fluid such as an alcohol or an alcohol-water mixture. The low surface tension fluid used should be readily miscible with water since the low surface tension fluid is preferably rinsed out of the membrane prior to contact with the alkali solution.

In a first step, the wetted membrane is contacted with a generally strong alkali solution which may be agitated or the alkali solution may be passed through the membrane either by positive pressure or by suction. As treated, the membrane is preferably in the form of a filter disc or filter cartridge. Alternatively, a continuous process may be used in which a strip or sheet of membrane material is passed through the alkali solution in a continuous manner. Any technique which provides good contact of the surfaces of the structure with the solution may be used.

The alkali employed may be, for example, an alkali metal hydroxide, or any alkaline earth metal hydroxide which is sufficiently soluble in water to provide a concentration of about 8 to 10 molar. Preferred are sodium and potassium hydroxides because of their high solubility and low cost. Potassium hydroxide is most preferred because it appears to be the most reactive toward polyvinylidene difluoride. When potassium hydroxide is employed, a minimum concentration of about 36% is preferred when ambient temperature is used. Typically, a concentration in the range of about 38 to 41%, by weight, based on the total weight of the solution is preferred.

The reaction of the PVDF substrate with alkali solution, i.e., the activation reaction, may be conducted at ambient, i.e., room temperature, or elevated temperatures, for example, from about ambient to about 100° F. Although a short reaction time such as about three minutes is preferred, the reaction time is a function of both temperature and the concentration of the alkali. Thus, longer exposure to the alkali may be required when the concentration of alkali is relatively low or when the reaction is conducted at a lower temperature.

The reaction of the polyvinylidene difluoride membrane with an aqueous solution of alkali is described as resulting in the formation of activated sites. Although not wishing to be held to any particular theory or explanation of the reactions involved, it is believed that unsaturated units are formed on the PVDF structures by elimination of hydrogen and fluoride atoms resulting from the action of the alkali solution. Thus, what is termed here an "activated" membrane (structure) is a formed membrane (structure) having a number of units of unsaturation or activated sites on the surface. As noted above, the term "surface" as used herein, includes both the gross surface area and the internal surfaces of the structures such as the pores of microporous structures.

RINSING THE ACTIVATED MEMBRANE

Even small amounts of alkali, i.e., less than 0.5% by weight (based on the weight of the monomer solution subsequently contacting the membrane) may be sufficient to interfere with subsequent grafting. Gels may be formed blocking the open area of the membrane and leading to reduced permeability. Therefore, after the alkali treatment step, or activation step, it is essential that the activated membrane be thoroughly rinsed to remove residual alkali and any other contaminants present. Any of the methods used to contact the membrane with alkali solution, as described above, may be employed to rinse the membrane. That is, the membrane may be immersed and agitated in a rinse bath (rinsed) or the rinse bath fluid forced (flushed) through the membrane under positive (upstream) or reduced (downstream) pressure. Water is the preferred medium to be used for this purpose.

CONTACTING THE ACTIVATED MEMBRANE WITH A SOLUTION OF MONOMER

The activated membrane, substantially free of alkali, is contacted with a solution of a polymerizable vinylic monomer by, for example, any of the methods described above in the treatment of the membrane with alkali solution and in the rinsing procedure.

Compounds suitable for use as the monomers of the present invention include vinylic or substituted vinylic (i.e., ethylenically unsaturated) polymerizable monomers, generally referred to herein as vinylic monomers. These vinylic monomers also include at least one carboxyl group, i.e., a

group, preferably conjugated with the ethylenically unsaturated bond. The polymer grafted to the PVDF substrate should include functional groups which are sufficiently polar or ionic to form hydrogen bonds or to ionize when contacted with an aqueous or polar liquid and these groups should be present in sufficient quantity to provide the requisite critical surface energy in the modified PVDF structure. Such polar or ionic functional groups may be present in the monomer product either as part of the carboxyl group or as an independent group. Alternatively, the monomer may include group which would in themselves not impart the polar or ionic nature to the modified PVDF structures sufficient to provide the requisite critical surface energy but which, after undergoing a chemical reaction, form such a polar or ionic functional group.

Preferred as a class of monomers are the alpha, beta unsaturated compounds having the general formula:

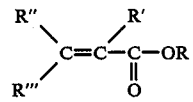

wherein R is H, an aminoalkyl or quaternized aminoalkyl group having 1 to 3 carbon atoms, or a hydroxyalkyl group having 1 to 3 carbon atoms, R', R", and R''' independently are H, an alkyl group having 1 to 3 carbon atoms, a carboxyl group (—COOH), a carboxyalkyl group having 1 to 3 carbon atoms, or a hydroxyalkoxycarbonyl group having 1 to 3 carbon atoms.

Compounds particularly preferred as the monomers in the present invention include acrylic acid, methacrylic acid, itaconic acid, 2-hydroxyethyl acrylate, 2-hydroxyethyl methacrylate, and 2-trimethylammonioethyl acrylate chloride. Most preferred is acrylic acid.

Mixtures of the aforementioned monomers may also be employed to form the high critical surface energy structures in accordance with this invention. Also, while the polymers grafted onto the substrate surfaces may desirably be converted to their corresponding ammonium or metal salts, the use of monomers in such form in carrying out the process in accordance with this invention is not preferred.

The monomer solution is the present invention also includes a polymerization initiator to initiate reaction and cause reaction to proceed at a reasonable rate. Suitable polymerization initiators should be soluble in the solvent system employed to at least the extent that a sufficient amount of the initiator is in the solution. The initiator should also be sufficiently reactive at the temperatures employed and should not otherwise contaminate the grafted product. Polymerization initiators of suitable type are known in the art. Preferred thermal polymerization initiators include potassium peroxydisulfate and/or ammonium peroxydisulfate (having chemical formulas $K_2S_2O_8$ and $(NH_4)_2S_2O_8$, respectively). Ammonium peroxydisulfate is preferred when it is desirable that the amount of ionic material introduced into the membrane be minimized.

Water is the solvent of choice when preparing the surface-modified membranes of the present invention. However, any solvent capable of dissolving both the monomer and the initiator without subsequently participating in or inhibiting the graft polymerization or otherwise adversely affecting the PVDF membrane is suitable.

The monomer should be present in solution in an amount sufficient to impart a high critical surface energy to the microporous PVDF membrane yet not so high as to result in pore blockage by homo- or copolymerization of the monomer resulting in undesirable reduced permeability of the membrane. Thus, generally, concentrations of about 0.3 to about 5.0% by weight are suitable, preferred concentrations being from about 0.4 to about 2.0% (based on the total weight of the solution).

When monomer concentrations are too low, membranes result which are not readily wettable with high surface tension fluids. Conversely, when monomer concentrations are too high, the membranes are characterized by reduced fluid permeability due to blockage of pores by polymer.

The concentration of the initiator is suitably within the range of about 2 to about 5%, by weight, based on the total weight of the solution. When ammonium peroxydisulfate is employed as the polymerization initiator, the preferred concentration is about 4% by weight.

Although other methods may be employed, the polymerization is preferably carried out by sealing the membranes impregnated with monomer-containing solution in a closed container and heating the container until polymerization is complete. This process may be carried out with either individual impregnated membrane sheets, with rolls of impregnated membrane, or with impregnated filter cartridges. Sealing in a heat-resistant container is desirable to avoid loss of solution components during the polymerization and grafting process step.

Heating can be accomplished in several ways. Filter membrane in bags may be heated in an air oven, by immersion in a hot water bath, or with microwave radiation. Alternate procedures are to submerse the membrane in a bath of the monomer-containing solution, and then raise the temperature of the solution to reaction temperature. Other modifications of the procedure may include the use of a steam chamber, an autoclave or other controlled humidity environments in which to conduct the polymerization reaction and avoid drying out the membrane. Such drying out is to be avoided since flow properties will be adversely effected although the membrane will still be surface-modified or hydrophilic.

Polymerization may be carried out at a temperature of about 85° to about 105° C., preferably about 90° to about 105° C. It is most convenient, and therefore preferable, to conduct the polymerization reaction at a temperature just below the boiling point of water, such as about 95° C. At this temperature, the reaction proceeds rapidly.

The duration of the polymerization reaction is variable depending upon whether individual sheets of membrane are being prepared or rolls of membrane. In addition, the duration of reaction is also a function of the reaction temperature. It has been found, when individual sheets of membrane are being prepared, a reaction period of about one hour or less is generally suitable, and typically the reaction can be completed within about twenty minutes. When rolls of membrane material are being treated, heat transfer characteristics become significant and a time period of from about eight to as much as about twenty-four hours may be required.

Particularly preferred conditions for producing structures with high critical surface energy in accordance with the present invention include unusually high initiator concentrations, low monomer concentrations, i.e., weight ratios of the initiator to the monomer which may range from about 1:1 to about 10:1, more preferably in the range of from about 2:1 to about 5:1, rapid attainment of grafting temperature, and relatively short reaction periods at the grafting temperature. These conditions and the relatively short polymer chains of grafted monomer on the activated structure are thought to produce the unusually high critical surface energies of the structures in accordance with this invention.

Indeed, as will be apparent from the Examples set out below, the permeability of the treated membranes when compared with the membrane (Control) was identical or even higher in some instances. As used herein, "without substantial pore blockage" refers to the treated membrane having at least about 75% of the water flow rate at 20 psid pressure, preferably at least about 85%, more preferably at least about 90%, and most preferably at least about 100% of the flow rate of the corresponding untreated, hydrophobic Control after the Control has been first wetted with a low surface tension fluid.

RINSING THE MEMBRANE

After the polymerization and grafting step, for most purposes, it is preferred to thoroughly rinse the membrane to remove undesirable materials.

The invention will be better understood by reference to the following Examples which are offered by way of illustration.

METHODS OF TESTING THE STRUCTURES OF THE FOLLOWING EXAMPLES

Liquid Drop Wetting Test

The pendent drop of liquid at the end of a polypropylene pipet is gently touched to the upper surface of the structure (membrane) being tested while the membrane is held in a horizontal position. The pipet is then withdrawn, leaving a small drop of liquid having a volume of about 0.05 milliliter on the surface of the membrane. The time required for the liquid to penetrate the membrane is recorded. Observation for a period of about 1 minute or less is generally sufficient to establish the critical surface energy (wettability) of the structure being tested. When the membrane is wettable by the particular liquid, thorough penetration of the liquid into and through the membrane may be evidenced by the opaque (when unwetted) membrane becoming translucent as the drop of liquid penetrates and wets the membrane, a zero contact angle of the drop with the surface of the structure (membrane), and, in some instances, by the disappearance of the drop. In some instances when a microporous membrane is wetted by the applied drop of liquid, the liquid passes through the membrane and appears on the other side.

Water Flow Test

The membrane to be tested is placed in a stainless steel filter holder of known flow area. The inlet of the filter holder is fitted with a pressure gauge. Filtered tap water is flowed through the membrane at a differential pressure of 20 psid. The filter effluent is collected in a graduated cylinder for a measured interval of time. The water permeability of the membrane at 20 psid is determined by the formula $$\text{Permeability} = \frac{V}{T \times A}$$

where V is the volume collected, T is the time during which it was collected and A is the flow area of the filter holder.

GENERAL PROCEDURE FOR FORMING HIGH CRITICAL SURFACE ENERGY PVDF MEMBRANES OF THE EXAMPLES

A dry, microporous, PVDF membrane in the form of a disc 142 mm in diameter was wetted with a solution of 25 weight percent t-butyl alcohol in water. The wetted membrane was then transferred to a trough of running deionized water and washed free of the t-butyl alcohol.

Activation of the membrane was accomplished by placing the water-wet PVDF membrane disc in a fritted glass funnel, covering the disc with an aqueous solution of potassium hydroxide (40 weight percent potassium hydroxide at ambient temperature unless otherwise noted), and drawing the solution through the membrane (contacting) by applying 5 inches Hg vacuum to the funnel for three minutes (unless otherwise noted). Excess potassium hydroxide solution was poured from the funnel and deionized water was then drawn through the membrane for three minutes using 20 inches Hg vacuum to remove residual alkali.

The membrane was then impregnated with the grafting solution by covering the membrane with a solution of acrylic monomer and a persulfate salt dissolved in deionized water. The particular monomer and the particular persulfate salt as well as their concentrations are described in the Examples below. To ensure complete impregnation of the membrane, 500 milliliters of the grafting solution was drawn through the membrane by applying a vacuum of 5 inches Hg to the funnel.

Each impregnated membrane disc prepared as described above was then placed between two seven inch by seven inch pieces of 2 mil polypropylene film, sealed in a bag prepared from aluminized polyethylene terephthalate Mylar ® available from E. I. Dupont de Nemour & Company (either as a specimen or as multiple specimens) and placed in an air circulating oven at 95° C. for 20 mintes. The discs were then removed from the bags, rinsed in water at about 80° C. for about one hour. Thereafter, they were flushed with water, by flowing water through the membrane, at about 70° C. for 15 minutes (except for the membrane of Example 1 which was flushed for 30 minutes) at a rate of about 0.5 liters per minute. Each flushed membrane was then dried in a 95° C. oven for 15 minutes and examined for wettability with water and with a 10:1 Buffered Oxide Etch ("BOE") solution (available from Allied Corporation and comprised of a mixture of 1 part by volume of a 49% by weight hydrofluoric acid in water solution and 10 parts by volume of a 40% by weight ammonium fluoride in water solution, the mixture having a measured surface tension of 88 dynes/cm). The membranes were also examined for water permeability by the Water Flow Test.

EXAMPLE 1

A 142 mm disc of hydrophobic, microporous PVDF membrane available from Pall Corporation and having a pore rating of about 0.2 micrometer was treated according to the General Procedure set out above. The aqueous based grafting solution contained 4.0 percent by weight potassium peroxydisulfate and 4.0 percent by weight acrylic acid. After being rinsed in 80° C. water, the membrane was flushed with water at about 70° C. for 30 minutes. When dry the resultant membrane was instantly wetted by water and BOE. The membrane had a water permeability of 3.2 liters per minute per ft$^2$ at 20 psid compared with 38.1 liters per minute per ft$^2$ for an untreatded membrane referred to hereinafter as Control (the Control required prewetting with isopropyl alcohol to initiate water flow prior to running the permeability test). These results are summarized below in Table I.

EXAMPLE 2

A 142 mm disc of hydrophobic, microporous PVDF membrane available from Pall Corporation and having a pore rating of about 0.2 micrometer was treated according to the General Procedure set out above. The aqueous based grafting solution contained 4.0 percent by weight potassium peroxydisulfate and 2.0 percent by weight acrylic acid. The resultant membrane was wetted instantly by both water and BOE. The membrane had a water permeability of 28.6 liters per minutes per ft$^2$ and 20 psid compared with 38.1 liters per minute per ft$^2$ for the Control. These results are summarized below in Table I.

EXAMPLE 3

A 142 mm disc of hydrophobic, microporous PVDF membrane available from Pall Corporation and having a pore rating of about 0.2 micrometer was treated in the same manner as the membrane of Example 2 except that the concentration of acrylic acid in the grafting solution was 1.5 percent by weight. The resultant membrane was wetted instantly by water and and in about 1 second by BOE. The membrane had a water permeability of 38.1 liters per minute per ft$^2$ at 20 psid compared with 38.1 liters per minute per ft$^2$ for the Control. These results are summarized below in Table I.

EXAMPLE 4

A 142 mm disc of hydrophobic, microporous PVDF membrane available from Pall Corporation and having a pore rating of about 0.2 micrometer was treated in the same manner as the membrane of Example 2 except that the concentration of acrylic acid in the grafting solution was 0.5 percent by weight. The resultant membrane was instantly wetted by water, but required about 20 seconds to wet thoroughly with BOE. The membrane had a water permeability of 40.7 liters per minute per ft$^2$ at 20 psid compared with 38.1 liters per minute per ft$^2$ for the Control. These results are summarized below in Table I.

EXAMPLES 5 AND 5A

A 142 mm disc of hydrophobic, microporous PVDF membrane available from Pall Corporation and having a pore rating of about 0.2 micrometer was treated in the same manner as the membrane of Example 2 except that the concentration of acrylic acid in the grafting solution was 0.4 percent by weight. The resultant membrane was not wettable by BOE, but was instantly wetted by water. THe membrane had a water permeability of 39.8 liters per minute per ft$^2$ at 20 psid compared with 38.1 liters per minute per ft$^2$ for the Control. These results are summarized below in Table I.

Another 142 mm disc of hydrophobic, microporous PVDF membrane available from Pall Corporation and having a pore rating of about 0.2 micrometer was treated in the same manner as the membrane of Example 2 except that the concentration of acrylic acid in the grafting solution was 0.2 percent by weight. The resultant membrane was not wettable by BOE, but was instantly wetted by water. The membrane had a water permeability of 37.5 liters per minute per ft$^2$ at 20 psid compared with 38.1 liters per minute per ft$^2$ for the Control. These results are summarized below in Table I.

TABLE I

| Membrane of Example | Percent of Acrylic Acid | Wetting Time with BOE | Wetting Time with Water | Water Flow at 20 psid, l./min. | Estimated Critical Surface Energy, dynes/cm |
|---|---|---|---|---|---|
| 1 | 4.0 | <1 sec | <1 sec | 3.2 | ≧88 |
| 2 | 2.0 | <1 sec | <1 sec | 28.6 | ≧88 |
| 3 | 1.5 | <1 sec | <1 sec | 38.1 | ≧88 |
| 4 | 0.5 | 20 sec | <1 sec | 40.7 | about 88 |
| 5 | 0.4 | — | <1 sec | 39.8 | about 81 |
| 5A | 0.2 | — | <1 sec | 37.5 | <75 |
| Control | No treatment | — | — | 38.1 | 32 |

The mechanical strength of the filter medium is unaffected by the surface modification of the invention as illustrated in Example 6.

EXAMPLE 6

The tensil strength of the membrane of Example 3 was measured using an Instron Universal Testing Instrument, Model 1130. A 6 inch long "dogbone" shaped test specimen with a central test area 2 inches long and ½ inch wide was cut from the membrane of Example 3. The specimen was wetted with water, placed in the tester and extended at the rate of 5 inches per minute. Tensile strength at break was found to be 1.1 lb/inch. A similar specimen of untreated membrane having the same pore size and thickness was prewetted with isopropyl alcohol, then washed with water to exchange the alcohol for water to produce a water-wet membrane. The tensile strength of the water-wetted untreated membrane (Control) was similarly measured to be 1.1 lb/inch.

To illustrate the superior wetting of membrane of this invention by high surface tension fluids, the wettability of commercial filter materials frequently used to filter fluids such as BOE was tested by the Liquid Drop Wetting Test. The wettability of the membrane of this invention as illustrated by the membrane of Example 3, and the wettability of some alternative, commercial filter materials are shown in Table II below.

TABLE II

| Filter Material | Material | Pore Rating, Micrometers | Wetting With BOE |
|---|---|---|---|
| Ex. 3 Membrane | modified PVDF hydrophilic | 0.2 | yes |
| Millipore Corp. (Durapore) | PVDF | 0.2 | no |

TABLE II-continued

| Filter Material | Material | Pore Rating, Micrometers | Wetting With BOE |
|---|---|---|---|
| Brunswick Corp. | hydrophilic polysulfone | 0.2 | no |
| Nucleopore | hydrophilic polycarbonate | 0.8 | no |
| Cuno (Polypro) | polypropylene | 1.2 | no |

EXAMPLE 7

A 142 mm disc of hydrophobic, microporous PVDF membrane available from Pall Corporation and having a pore rating of about 0.2 micrometer was treated in the same manner as the membrane of Example 2 except that the ethylenically unsaturated monomer in the grafting solution was methacrylic acid present at a concentration of 1.5 percent by weight. The resultant membrane was wetted instantly with water and in about 1 second with BOE. The water permeability was 39.0 liters per minute per ft$^2$ at 20 psid compared with 38.1 liters per minute per ft$^2$ for the Control. These results are summarized below in Table III.

EXAMPLE 8

A 142 mm disc of hydrophobic, microporous PVDF membrane available from Pall Corporation and having a pore rating of about 0.2 micrometer was treated in the same manner as the membrane of Example 2 except that the ethylenically unsaturated monomer in the grafting solution was 2-hydroxyethyl acrylate present in a concentration of 1.5 percent by weight. The resultant membrane was wetted instantly by both water and BOE. The water permeability was 39.4 liters per minute per ft$^2$ at 20 psid compared with 38.1 liters per minute per ft$^2$ for the Control. These results are summarized below in Table III.

EXAMPLE 9

A 142 mm disc of hydrophobic, microporous PVDF membrane available from Pall Corporation and having a pore rating of about 0.2 micrometer was treated in the same manner as the membrane of Example 2 except that the ethylenically unsaturated monomer in the grafting solution was itaconic acid present in a concentration of 1.5 percent by weight. The resultant membrane was wetted instantly by water and in one second by a 55% BOE solution, i.e., a solution comprised of 55 parts by volume BOE and 45 parts by volume water, the solution having a surface tension of 81 dynes/cm. The water permeability was 41.8 liters per minute per ft$^2$ psid compared with 38.1 liters per minute per ft$^2$ for the Control. These results are summarized below in Table III.

TABLE III

| Membrane of Example | Monomers | Concentration of Monomer | Wetting Time with BOE | Water Flow at 20 psid l./min. | Estimated Critical Surface Energy, dynes/cm |
|---|---|---|---|---|---|
| 3 | acrylic acid | 1.5% | <1 sec | 38.1 | ≧88 |
| 7 | methacrylic acid | 1.5% | <1 sec | 39.0 | ≧88 |
| 8 | 2-hydroxyethyl acrylate | 1.5% | <1 sec | 39.4 | ≧88 |
| 9 | itaconic acid | 1.5% | — | 41.8 | about 81 |
| Control | untreated | — | — | 38.1 | 32 |

EXAMPLES 10 and 10A

A 142 mm disc of hydrophobic 0.22 micrometer rated microporous PVDF membrane available from Millipore Corporation under the trade name Durapore was treated in the same manner as the membrane of Example 3. The resultant membrane was wetted instantly by water and within 2 seconds by BOE indicating that the membrane had a critical surface energy of 88 dynes/cm or higher.

In like manner, a 142 mm disc of hydrophilic, microporous PVDF membrane also available from Millipore Corporation under the tradename Durapore was treated in the same manner as the membrane of Example 3. The resultant membrane was wetted instantly by water and within 6 seconds by BOE indicating that the membrane had a critical surface energy of 88 dynes or higher.

The effect of varying the concentration of alkali used during the activation step is illustrated in Examples 11-15 below. Example 13 in combination with Examples 11 and 12 shows that lengthening the time of exposure of the membrane to alkali can compensate for lowering the concentration of alkali used.

EXAMPLE 11

A 142 mm disc of hydrophobic, microporous PVDF membrane available from Pall Corporation and having a pore rating of about 0.2 micrometer was treated in the same manner as the membrane of Example 3 except that the potassium hydroxide solution was drawn through the membrane by applying 7.5 inches Hg vacuum to the funnel for two minutes, the contact time of the membrane with potassium hydroxide was two minutes, and the polymerization initiator used in the grafting solution was ammonium peroxydisulfate. The resultant membrane was wetted within one second by BOE. These results are summarized in Table IV below.

EXAMPLE 12

A 142 mm disc of hydrophobic, microporous PVDF membrane available from Pall Corporation and having a pore rating of about 0.2 micrometer was treated in the same manner as the membrane of Example 11 except that the concentration of potassium hydroxide used was 39 percent by weight. The resultant membrane was wetted in about 15 seconds by BOE. These results are summarized below in Table IV.

EXAMPLE 13

A 142 mm disc of hydrophobic, microporous PVDF membrane available from Pall Corporation and having a pore rating of about 0.2 micrometer was treated in the same manner as the membrane of Example 12 except that the contact time of the membrane with potassium hydroxide was 3 minutes. The resultant membrane was wetted within 1 second by BOE. These results are summarized below in Table IV.

EXAMPLE 14

A 142 mm disc of hydrophobic, microporous PVDF membrane available from Pall Corporation and having a pore rating of about 0.2 micrometer was treated in the same manner as the membrane of Example 11 except that the concentration of potassium hydroxide used was 38 percent by weight. The resultant membrane was wetted slowly with BOE, being only partially wetted after about one minute. These results are summarized below in Table IV.

EXAMPLE 15

A 142 mm disc of hydrophobic, microporous PVDF membrane available from Pall Corporation and having a pore rating of about 0.2 micrometer was treated in the same manner as the membrane of Example 11 except that the concentration of potassium hydroxide used was 37 percent by weight. The resultant membrane was not wettable by BOE. These results are summarized below in Table IV.

TABLE IV

| Membrane of Example | Percent KOH | Contact Time with KOH (min) | Time to Wet with BOE (sec) |
|---|---|---|---|
| 11 | 40 | 2 | 1 |
| 12 | 39 | 2 | 15 |
| 13 | 39 | 3 | 1 |
| 14 | 38 | 2 | >60 |
| 15 | 37 | 2 | did not wet |

EXAMPLE 16

A 10 inch long filter cartridge containing about 8 ft$^2$ of pleated hydrophobic, microporous PVDF membrane available from Pall Corporation and having a pore rating of about 0.5 micrometer was prepared by conventional filter cartridge manufacturing means. The filter cartridge was treated by the method described in the General Procedure by placing the cartridge in a filter housing connected to a reservoir tank in a system designed to allow recirculation of fluid through the filter cartridge. The filter cartridge was wetted by submersion in isopropyl alcohol and then flushed with deionized water to remove the alcohol. A solution of 40 percent by weight potassium hydroxide was pumped through the filter for a period of three minutes. The temperature of the solution was 23° C. After three minutes' exposure to potassium hydroxide, deionized water was then immediately flowed through the filter for a period of 5 minutes to remove residual alkali. An aqueous based grafting solution containing 4 percent by weight $K_2S_2O_8$ and 1.5 percent by weight acrylic acid, the balance being water, was then flowed through the filter cartridge for 3 minutes. The filter cartridge was then sealed in an aluminized Mylar$^R$ bag with 25 ml additional grafting solution. The first bag containing the filter cartridge was then sealed inside a second such bag and the entire package was placed in an oven at 95° C. for 16 hours.

After the filter cartridge was removed from the bags, deionized water at 75° C. was flowed through the filter at a rate of about 1 pint per minute for 105 minutes. The filter was then dried in an oven for 12 hours at 175° F. After treatment, the PVDF filter medium was instantly wettable with BOE, and the cartridge had a water permeability of 6.0 gpm at a differential pressure of 1.0 psid. These results are summarized in Table V below.

EXAMPLE 17

A 10 inch long filter cartridge containing about 8 ft$^2$ of pleated hydrophobic, microporous PVDF membrane available from Pall Corporation and having a pore rating of about 0.5 micrometer was prepared by conventional filter cartridge manufacturing means. The filter cartridge was treated in the same manner as in Example 16 except that the initiator in the grafting solution was ammonium peroxydisulfate at a concentration of 3.86% by weight instead of potassium peroxydisulfate. After treatment, the PVDF filter medium was instantly wettable by BOE, and the filter cartridge had a water permeability of 6.0 gpm at a differential pressure of 1.0 psid. These results are summarized in Table V below.

EXAMPLE 18

A 10 inch long filter cartridge containing about 8 ft$^2$ of pleated hydrophobic, microporous PVDF membrane available from Pall Corporation and having a pore rating of about 0.5 micrometer was prepared by conventional filter cartridge manufacturing means. The filter cartridge was treated in the same manner as in Example 16 except that the concentration of KOH used was 38 percent by weight and the temperature of the KOH solution was 30° C. After treatment, the PVDF filter medium was instantly wettable by BOE, and the filter cartridge had a water permeability of 6.0 gpm at a differential pressure of 1.0 psid, compared with an untreated filter of the same construction (Control), which was not wettable by BOE, but had a water permeability of 6.0 gpm at 1.0 psid (after prewetting with isopropyl alcohol to initiate water flow). These results are summarized in Table V below.

TABLE V

| Filter Example | Percent KOH | Temperature of KOH (°C.) | Peroxydisulfate Salt | Water Flow Rate at 1.0 psid (gpm) | Wets with BOE |
|---|---|---|---|---|---|
| 16 | 40 | 23 | K | 6.0 | yes |
| 17 | 40 | 23 | NH$_4$ | 6.0 | yes |
| 18 | 38 | 30 | NH$_4$ | 6.0 | yes |
| Control | no treatment | | — | 6.0 | no |

EXAMPLE 19

The membrane of Example 3 was examined for wetting with aqueous based solutions having surface tensions higher than that of water. A commercial hydrophilic PVDF membrane sold by Millipore Corporation under the name Durapore ® and having a similar pore size so that of the membrane of Example 3 was similarly tested for wetting. The results are summarized in Table VI below.

TABLE VI

| Test Solution | Surface Tension | Time to Wet Membrane of Example 3 | Time to Wet Hydrophilic Durapore |
|---|---|---|---|
| Water | 72 dynes/cm | <1 sec | 1 sec |
| 25% BOE[1] | 74 dynes/cm | <1 sec | ca 60 sec |
| 55% BOE[2] | 81 dynes/cm | <1 sec | non-wetting |
| BOE | 87 dynes/cm | <1 sec | non-wetting |
| 30.6 wt % NaOH | 96 dynes/cm | 2 sec | non-wetting |

[1] 1 part by weight of BOE diluted with 3 parts by weight of water.
[2] 55 parts by weight of BOE diluted with 45 parts by weight of water.

The results set out in Table VI demonstrate that the method in accordance with this invention can provide structures with critical surface energies as high as 96 dynes/cm.

EXAMPLE 20

A 6 inch by 6 inch square of a thermally bonded, non-woven PVDF fibrous web having a weight of 64 grams per square meter and a thickness of 0.42 mm was treated according to the method of Example 3 except that (1) the web was contacted with potassium hydroxide solution by agitating the web in a solution of the alkali for about 5 seconds and allowing it to remain in the solution for a total of 3 minutes, (2) alkali was washed out of the web by placing it in a trough of running deionized water for about 10 minutes while briefly agitating the web in the water during this period, (3) the web was contacted with grafting solution by agitating the web for about 5 seconds in a bath of the grafting solution and allowing the web to remain in the solution for about 5 minutes, and (4) the web was not flushed with deionized water at 75° C.

[1] 1 part by weight of BOE diluted with 3 parts by weight of water.
[2] 55 parts by weight of BOE diluted with 45 parts by weight of water.

When dry, the web was instantly wettable with BOE and with water compared with an untreated sample of the PVDF web which would not wet with either water or BOE.

We claim:

1. A method of making a polyvinylidene difluoride structure with a high critical surface energy comprising the steps of:
   (a) contacting a polyvinylidene difluoride structure with an alkali solution to form activated sites on the surface of said structure;
   (b) rinsing the activated structure to remove residual alkali;
   (c) contacting the rinsed, activated structure with a solution of a polymerization initiator and polymerizable vinylic monomer; and
   (d) polymerizing and grafting said monomer to said activated structure to form a polyvinylidene difluoride structure with a critical surface energy of at least about 80 dynes/cm.

2. The method of claim 1 wherein said polyvinylidene difluoride structure comprises a porous membrane or a fibrous web.

3. The method of claim 1 wherein said monomer comprises an alpha, beta unsaturated compound having the formula:

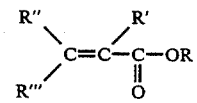

wherein R is H, an aminoalkyl or quaternized aminoalkyl group having 1 to 3 carbon atoms, or a hydroxy alkyl group having 1 to 3 carbon atoms; R', R", and R'" independently are H, an alkyl group having 1 to 3 carbon atoms, a carboxyl group (—COOH), a carboxyalkyl group having 1 to 3 carbon atoms, or a hydroxyalkoxycarbonyl group having 1 to 3 carbon atoms.

4. The method of claim 1 wherein said monomer is selected from the class consisting of acrylic acid, methacrylic acid, itaconic acid, 2-hydroxyethyl acrylate, 2-hydroxyethyl methacrylate, 2-trimethylammonioethyl acrylate chloride and mixtures thereof.

5. The method of claim 4 wherein said alkali solution comprises an alkali metal hydroxide.

6. The method of claim 4 wherein said solution of a polymerization initiator and polymerizable vinylic monomer comprises from about 0.3 to about 5 weight percent of said monomer and from about 2 to about 5 weight percent of said polymerization initiator and the weight ratio of said polymerization initiator to said monomer is in the range of from about 1:1 to about 10:1.

7. The method of claim 5 wherein said alkali solution comprises from about 38 to about 41%, by weight, potassium hydroxide.

8. The method of claim 5 wherein aid polymerization initiator comprises potassium peroxydisulfate.

9. The method of claim 4 wherein said polymerization initiator comprises ammonium peroxydisulfate.

10. The method of claim 1 wherein said polyvinylidene difluoride structure is a microporous membrane having a pore rating in the range of from about 0.01 to about 2 micrometers, said alkali solution comprises potassium hydroxide, said polymerization initiator is a salt of peroxydisulfate, and said polymerizable vinylic monomer comprises a monomer selected from the class consisting of acrylic acid, methacrylic acid, itaconic acid, 2-hydroxyethyl acrylate, 2-hydroxyethyl methacrylate, 2-trimethylammonioethyl acrylate chloride and mixtures thereof.

11. The method of claim 10 wherein said alkali solution comprises from about 36 to about 41%, by weight, potassium hydroxide and said contacting of said polyvinylidene difluoride with said alkali solution is carried out at a temperature in the range of from ambient to about 100° C., said solution of a polymerization initiator and polymerizable vinylic monomer comprises from about 0.4 to about 2 weight percent acrylic acid and from about 2 to about 5 weight percent ammonium peroxydisulfate, and said polymerizing and grafting of said monomer to said activated structure is carried out at a temperature in the range of from about 85° to about 105° C.

12. The method of claim 11 wherein said polyvinylidene difluoride structure is a microporous membrane in the form of a disc, cartridge or sheet material.

13. The method of claim 10 wherein said critical surface energy is at least about 85 dynes/cm.

* * * * *